Figure 1:
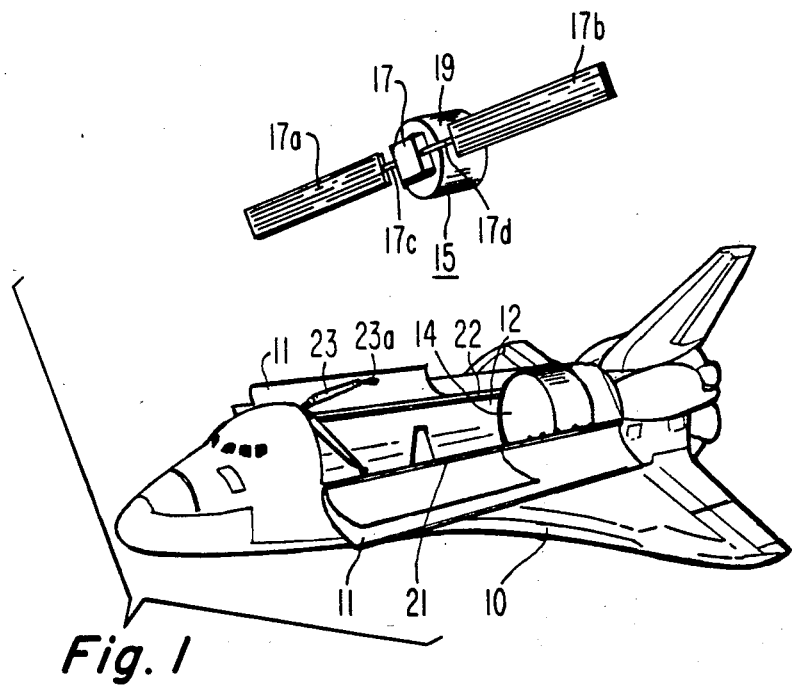

United States Patent [19]

Hayden et al.

[11] Patent Number: 4,667,908

[45] Date of Patent: May 26, 1987

[54] MULTIPLE BODY HANDLING OPERATIONS ON THE SPACE SHUTTLE

[75] Inventors: John H. Hayden, Bucks County, Pa.; Alvin W. Sheffler, Mercer County, N.J.

[73] Assignee: RCA Corporation, Princeton, N.J.

[21] Appl. No.: 673,378

[22] Filed: Nov. 20, 1984

[51] Int. Cl.⁴ .............................................. B64G 1/10
[52] U.S. Cl. .................................. 244/161; 244/158 R
[58] Field of Search .................. 244/158 R, 160, 161, 244/162

[56] References Cited

U.S. PATENT DOCUMENTS

| | | | |
|---|---|---|---|
| 3,753,536 | 8/1973 | White | 244/161 |
| 3,893,573 | 7/1975 | Fletcher et al. | 244/161 |
| 4,079,904 | 3/1978 | Groskopfs et al. | 244/162 |
| 4,273,305 | 6/1981 | Hinds | 244/158 R |

*Primary Examiner*—Trygve M. Blix
*Assistant Examiner*—Rodney Corl
*Attorney, Agent, or Firm*—Clement A. Berard, Jr.; Robert L. Troike

[57] ABSTRACT

A method is disclosed for exchanging a payload module on a satellite comprising a control module and a detachable payload for a new payload module in the STS or space shuttle orbiter using one RMS or remote manipulator system. In the method after the space shuttle orbiter is placed near the satellite the RMS rotates the new payload in a position to present the control module attachment end away from the cargo bay. The RMS then captures the satellite and positions it in the cargo bay of the orbiter adjacent the new module with the control module facing away from the cargo bay. The control module is moved to the new payload module and the assembly deployed in space away from the space shuttle orbiter.

6 Claims, 10 Drawing Figures

MULTIPLE BODY HANDLING OPERATIONS ON THE SPACE SHUTTLE

This invention relates to multiple body handling operations on the space shuttle orbiter and more particularly to retrieving satellites and exchanging old payloads for new payloads and redeploying the satellites.

The Space Transportation System (STS) also commonly referred to as the "space shuttle orbiter" has made it possible to rendezvous with existing satellites, retrieve the satellites, perform repairs or modifications and release the satellites or to bring the satellites back down to earth. The Remote Manipulator System (RMS) located on the space shuttle orbiter is used for retrieving and deploying the satellites.

During space shuttle orbiter missions it is planned to launch a spacecraft consisting of two modules into orbit from the orbiter, then at some later time to retrieve that spacecraft, replace one of the modules with another identical module, return the original module to earth, leaving the newly assembled modules on orbit. The on-orbit exchange of these three spacecraft modules is referred to as a three body handling problem. This invention relates to a means for handling these multiple bodies in space using the existing one Remote Manipulator System (RMS) on the space shuttle orbiter without additional articulated devices or extravehicular activities by the astronauts.

Recent experiments in space have indicated a desirability of manufacturing certain materials such as pharmaceutical drugs in space due to the low gravity conditions. It is planned therefore to launch and maintain factories in space which are reachable by the space shuttle orbiter or to bring such factories to the orbiter's orbit. This three body handling problem is particularly related to exchanging these factories.

SUMMARY OF THE INVENTION

In accordance with one embodiment of the present invention the method of exchanging a new payload module for an old payload module on a satellite comprising a control module and a payload module using the RMS or remote manipulator system comprises the steps of maneuvering the orbiter near the dual module satellite, capturing the dual module satellite with the RMS and positioning it in the orbiter, removing the control module from the old payload module using the RMS, attaching the control module on the new payload module and using the RMS for deploying the satellite comprising the control module and the new payload module in space.

In the drawings:

FIG. 1 illustrates the space shuttle orbiter with the cargo bay doors open and positioned near a satellite to be serviced.

Figure 2:
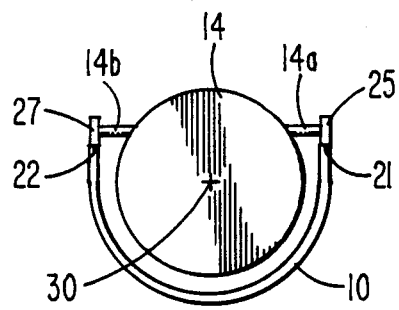
Figure 3:
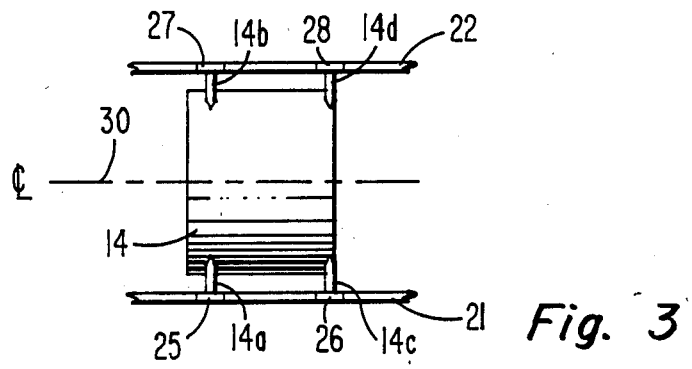
Figure 4:
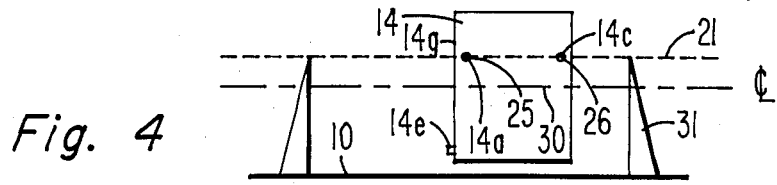
Figure 5:
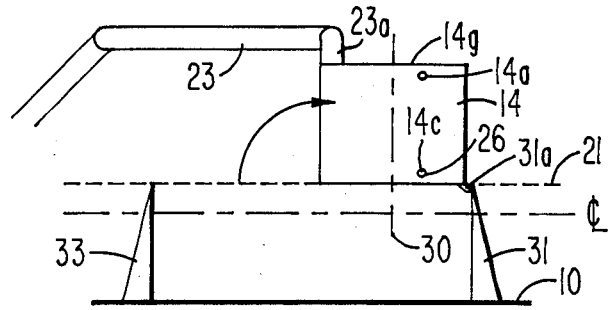
Figure 7:
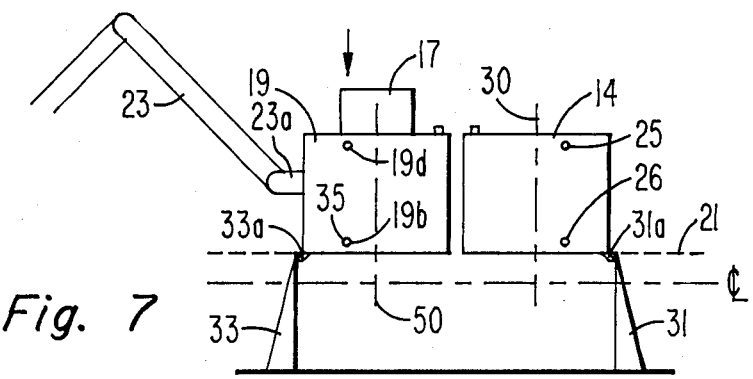
Figure 8:
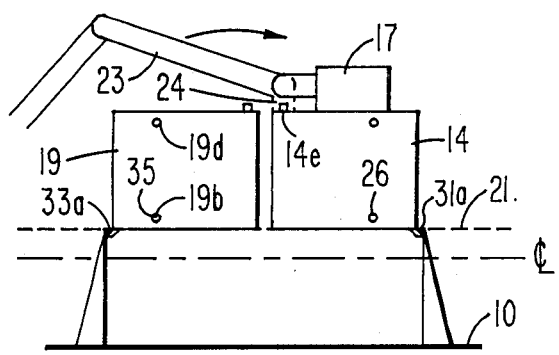
Figure 10:
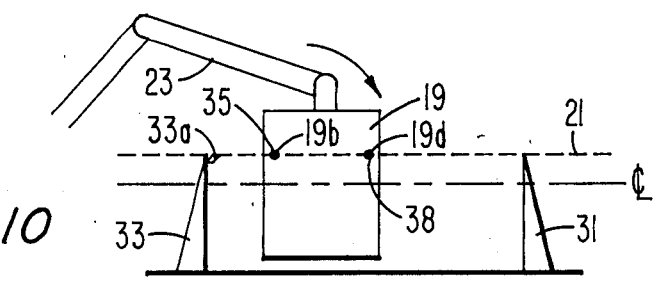
Figure 6:
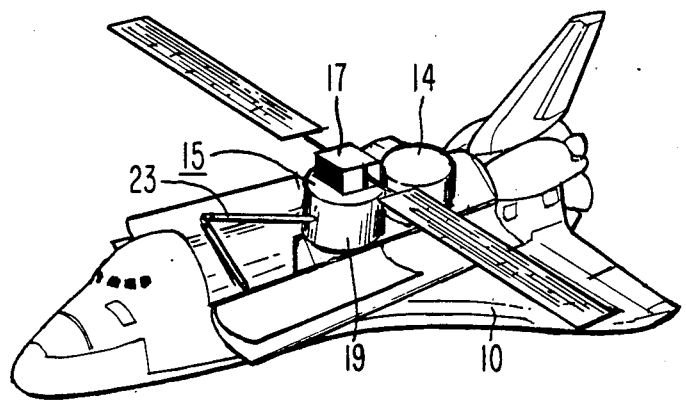
Figure 9:
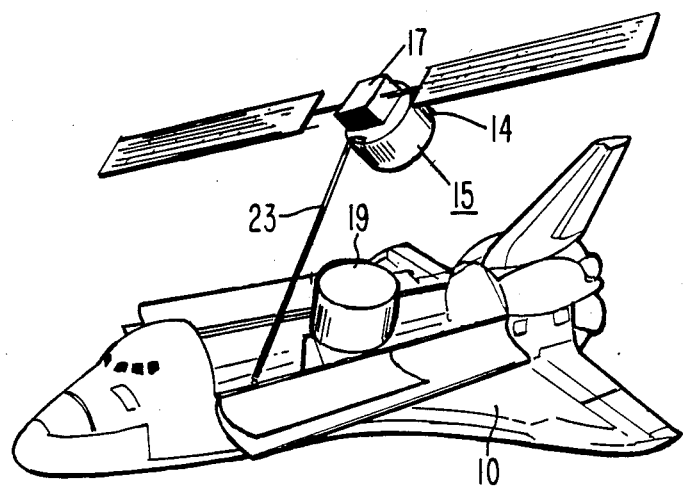

FIG. 2 is an end view sketch of the new payload module in the cargo bay of the space shuttle orbiter of FIG. 1, FIG. 3 is a top view of the new payload module of FIG. 2, FIG. 4 is a functional sketch illustrating the new payload module stored in the space shuttle orbiter cargo bay, FIG. 5 is a functional sketch of the payload module rotated 90° in the space shuttle orbiter, FIG. 6 illustrates the space shuttle orbiter with the RMS coupled to the satellite, FIG. 7 is a functional sketch of the old and new payload modules positioned adjacent to each other, FIG. 8 is a functional sketch illustrating the positioning of the control module on the new payload module, FIG. 9 illustrates the space shuttle orbiter with the new payload and control module being deployed in space, and FIG. 10 is a functional sketch illustrating the old payload module being rotated 90° by the RMS.

Referring to FIGS. 1 through 4 there is illustrated the STS or space shuttle orbiter 10 with the cargo bay doors 11 open revealing a new payload module 14 which has its center axis 30 generally aligned with the longitudinal centerline of the cargo bay 12. The space shuttle orbiter 10 has been maneuvering near a free flying satellite 15 comprising a control module 17 and an attached payload module 19. The satellite 15 may also be brought to the orbiter 10 orbit from some other orbit such as geosynchronous. The payload module 19 may be, for example, a factory module. The payload module 19 is like that of payload module 14 and is connected by detachable mounting means to the control module 17. The control module 17 is a typical satellite with its own attitude and position sensors, attitude and position control systems, thrusters and fuel tanks, communication antennas, and power bus. The power bus includes solar array panels illustrated by 17a and 17b on extended arms 17c and 17d. The power bus may also power the payload module through the mounting means.

The payload module 14 or 19 includes two sets of trunnions where each set includes a pair of trunnions that extend from the opposite sides and mate with latches which are located on the longitudinally extending top longerons 21 and 22 of the cargo bay. These longerons 21 and 22 extend the longitudinal length of the cargo bay 12 above the cargo door hinges. Referring to FIGS. 2 and 3 the new payload 14 includes a forward set of trunnions 14a and 14b which are pivotally mounted by two latches 25 and 27 to the longerons 21 and 22 respectively of the space shuttle orbiter cargo bay. The new payload module 14 includes an aft set of trunnions 14c and 14d which are pivotally mounted by two latches 26 and 28 on longerons 21 and 22. The latches 25–28 have bearings therein to permit rotation of the trunnions therein. The latches may be opened or closed by remote control using solenoids for example. Such latches are well known. The trunnions are aligned and as shown in FIG. 2 are aligned slightly above the centerline of the cargo bay and the module 14.

The space shuttle orbiter includes a Remote Manipulator System (RMS) 23 or remote manipulator arm assembly that has one end coupled to the longeron 21 near the cabin end. The RMS is remotely controlled by astronauts in the aft flight deck of the orbiter. The RMS comprises three sections which are joined by movable joints with the remote free end 23a having a wrist joint and what is termed an "end effector". The end effector is adapted to mate with and attach to or decouple from fittings on the satellite control module or payload module.

Referring to FIG. 4 there is illustrated a sketch of the new payload module 14 in its stored position as illustrated in FIGS. 1, 2 and 3. As represented in FIGS. 1 through 4 the module payload 14 is fixed to the space shuttle orbiter 10 using the latches 25–28 at longerons 21 and 22 located above the longitudinal centerline of the cargo bay. Support fittings 31 and 33 extend from the space shuttle orbiter keel through the centerline of the cargo bay near the payload module 14.

In accordance with the method described herein, the RMS 23 is first oriented so that the end effector 23a grasps onto and captures a fitting 14e on the payload module 14 as shown in FIG. 4. The latches 25 and 27 holding forward trunnions 14a and 14b are released. The RMS 23 coupled to the payload module 14 at 14e rotates the payload module 14 90° about the trunnions 14c and 14d so the payload module axis 30 that was aligned with the longitudinal centerline of the space shuttle orbiter cargo bay is perpendicular to this axis of the cargo bay. See FIG. 5. In this manner the control module mating surface 14g of module 14 extends away from the cargo bay towards space. This surface 14g includes the adapter for mounting the control module 17 thereto. When the payload module 14 has been rotated 90° on the aft trunnions 14c and 14d, the payload module 14 is latched to the vertical extending keel support fitting 31 using releasable automatic latch 31a. The RMS 23 is then disconnected and withdrawn.

The RMS 23 is then attached to the spacecraft 15 and, in particular, to a center grapple on the side of the old payload module 19 as shown, for example, in FIG. 6. This assumes that the spacecraft 15 has been maneuvered adjacent to the space shuttle orbiter 10 and the control module 17 attitude control system shut down. The RMS 23 is then operated to place the spacecraft 15 as shown in FIG. 7 with its axis 50 perpendicular to the longitudinal axis of the cargo bay of the space shuttle orbiter 10 and with the old payload module 19 oriented with the control module out or away from the bay. The old payload module 19 is placed in the bay rotated 180° about its axis 50 with respect to the new payload module 14. The RMS 23 places the spacecraft 15 such that the payload module 19 which contains aft trunnions 19a and 19b (not shown) in the forward latches 35 and 37 (not shown) on longerons 21 and 22 and also such that the support fittings 23 is latched to one corner of the used payload module 19 at latch 33a.

At this point the control module 17 may be refurbished as required. The RMS 23 is unlatched and withdrawn. The solar arrays 17a and 17b and extended arms (not shown in FIGS. 7 and 8) may be still deployed or in order to prevent interference these solar arrays and antennas may be folded or retracted prior to maneuvering the satellite 15 into the space shuttle orbiter cargo bay.

The control module 17 is then detached from the spent or old payload module 19. The RMS 23 is attached to a forward grapple fixture on the control module 17 and the control module is then transported by the RMS 23 to the new payload module 14 as shown in FIG. 8 where it is docked and coupled with the identical attachment mechanism on the payload module 14. The attachment mechanism may be, for example, a motor driven screw mechanism that extends from the payload module 14 into a threaded aperture in the control module. The top of the payload module may include alignment pins that mate with holes in the control module. As shown in the dotted line 24 in FIG. 8 the end effector 23a is unlatched and withdrawn from the control module 17 and reattached to the top grapple 14e of the payload module 14. The latches 26, 28 and 31 are released and the RMS 23 swings the satellite comprising the control module 17 and the attached new payload module 14 into space as illustrated in FIG. 9.

The RMS 23 is then connected to a side fixture on the used payload module 19. After the latch 33a on support fitting 33 is unlatched, the RMS 23 rotates the module 19 90° to its stowed position where the trunnions 19c and 19d are fixed to latches 36 and 38 (not shown) on longerons 21 and 23. See FIG. 10. In the stowed position the axis 50 of the payload module 19 is aligned with the longitudinal centerline of the cargo bay 12. The RMS is retracted and stowed and the cargo bay doors are closed with the used payload module 19 for return to earth.

What is claimed is:

1. A method of exchanging payload modules on a satellite comprising a control module and a detachable payload module using one RMS on the space shuttle orbiter where said payload module performs essentially all of the payload functions of the satellite and includes trunnions thereon which mate directly with releasable latches located on the longerons of the cargo bay and said control module includes the nonpayload equipment such as the solar arrays, power bus, attitude and position sensors and satellite control equipment comprising the steps of:
    (a) maneuvering said orbiter containing a new payload module near said satellite,
    (b) using the RMS, capturing the satellite containing the used payload module and positioning it in the bay of said orbiter with the trunnions of the used payload module in said latches on the longerons of the cargo bay and closing the latches to secure the satellite,
    (c) removing the control module from the used payload module using the RMS and placing the control module on the new payload module,
    (d) attaching the control module to the new payload module, and
    (e) deploying the satellite comprising the control module and the new payload module in space away from said orbiter.

2. The method of claim 1 including before step b the step of rotating the new payload module about a pair of said trunnions within a pair of said latches so the control module attachment faces away from said orbiter cargo bay and step b including positioning the used payload module so the control module also faces away from said orbiter cargo bay.

3. The method of claim 1 including before step b the step of retracting the solar arrays on the control module.

4. The method of claim 3 including after step e the step of deploying the retracted solar arrays.

5. The steps of claim 1 wherein before capturing the dual module satellite the solar arrays on the control module are retracted and/or folded.

6. A method of exchanging payload modules on a satellite comprising a control module and a detachable payload module using one RMS on the space shuttle orbiter where said payload module performs essentially all of the payload functions of the satellite and includes trunnions thereon which mate directly with standard releasable latches located on the top longerons of the cargo bay and said control modules includes the nonpayload equipment including solar arrays, power bus, and attitude sensors comprising the steps of:
    maneuvering said orbiter containing a new payload module near the dual module satellite,
    using the RMS rotating the new payload about a pair of said trunnions within a pair of said latches so that the control module attachment end faces away from the orbiter bay and generally toward the satellite, capturing the dual module satellite including the control module and the used payload module with the RMS and positioning the satellite by the RMS into said orbiter cargo bay adjacent said new payload with the control module facing in the same direction as the new payload module attachment end with the trunnions in said latches on the longerons of the cargo bay, latching said satellite in said bay at said used payload module, disconnecting said used payload module from said control module while the RMS is holding said control module, moving said control module using said RMS from the used payload module to said new payload module, attaching the control module on the new payload module, unlatching said new payload module from said cargo bay, and using said RMS deploying the satellite including the control module and the new payload module into space away from said orbiter.

* * * * *